(12) United States Patent
Bradski et al.

(10) Patent No.: US 7,379,560 B2
(45) Date of Patent: May 27, 2008

(54) METHOD AND APPARATUS FOR MONITORING HUMAN ATTENTION IN DYNAMIC POWER MANAGEMENT

(75) Inventors: Gary R. Bradski, Palo Alto, CA (US);
Aaron M. Tsirkel, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 10/382,636

(22) Filed: Mar. 5, 2003

(65) Prior Publication Data

US 2004/0175020 A1    Sep. 9, 2004

(51) Int. Cl.
*G06K 9/00* (2006.01)
*G09G 5/00* (2006.01)
*A61B 3/14* (2006.01)

(52) U.S. Cl. .................. 382/103; 345/156; 351/209
(58) Field of Classification Search ............... None
See application file for complete search history.

(56) References Cited

U.S. PATENT DOCUMENTS

| | | | | |
|---|---|---|---|---|
| 5,802,220 A | * | 9/1998 | Black et al. | 382/276 |
| 6,526,159 B1 | * | 2/2003 | Nickerson | 382/117 |
| 6,734,845 B1 | * | 5/2004 | Nielsen et al. | 345/211 |
| 6,825,769 B2 | * | 11/2004 | Colmenarez et al. | 340/575 |
| 7,068,813 B2 | * | 6/2006 | Lin | 382/103 |
| 2001/0020837 A1 | * | 9/2001 | Yamashita et al. | 318/567 |
| 2001/0052911 A1 | * | 12/2001 | Boyle et al. | 345/763 |
| 2002/0186348 A1 | * | 12/2002 | Covannon et al. | 351/240 |
| 2003/0146901 A1 | * | 8/2003 | Ryan | 345/158 |
| 2004/0054976 A1 | * | 3/2004 | Takahashi et al. | 716/8 |
| 2004/0061831 A1 | * | 4/2004 | Aughey et al. | 351/209 |

OTHER PUBLICATIONS

Zakaria Ajmal et al., "Learning a Face Model for Tracking and Recognition", 2002 IEEE, pp. IV-3612-IV-3615.
Kyung-Nam Kim et al., "Vision-Based Eye-Gaze Tracking for Human Computer Interface", 1999 IEEE, pp II-324-II-329.
Paul Viola et al., "Rapid Object Detection Using a Boosted Cascade of Simple Features", Accepted Conference on Computer Vision and Pattern Recognition 2001, pp. 1-9.

* cited by examiner

*Primary Examiner*—Bhavesh M. Mehta
*Assistant Examiner*—Charles Kim
(74) *Attorney, Agent, or Firm*—Blakley, Sokoloff, Taylor & Zafman LLP (57) ABSTRACT

Method and apparatus of the present invention include an image-capturing device coupled to a computer system. An image captured by the image-capturing device is analyzed using a face tracking technique to learn behaviors of the user. This may include determining if the user is paying attention. The attention may be toward a display of the computer system. When the user does not pay attention, power consumption of one or more components of the computer system is reduced.

10 Claims, 11 Drawing Sheets

METHOD AND APPARATUS FOR MONITORING HUMAN ATTENTION IN DYNAMIC POWER MANAGEMENT

FIELD OF INVENTION

The present invention relates generally to computer systems and more specifically to power management for computer systems.

BACKGROUND

Computer systems are becoming increasingly pervasive in our society, including everything from small handheld electronic devices, such as personal digital data assistants and cellular phones, to application-specific electronic components, such as set-top boxes and other consumer electronics, to medium-sized mobile and desktop systems to large workstations and servers. Long battery life has always been a goal of mobile systems and long battery life has become even more important with the deployment of wireless technology that allows mobile systems to remain completely un-tethered.

To provide more powerful computer systems for consumers, designers strive to continually increase the operating speed of the processor. A by-product of increasing processor speed is an increase in the amount of power consumed by the processor. The increased system power consumption result in need for bigger thermal/cooling system, bigger power delivery system and reducing battery life.

Figure 1:
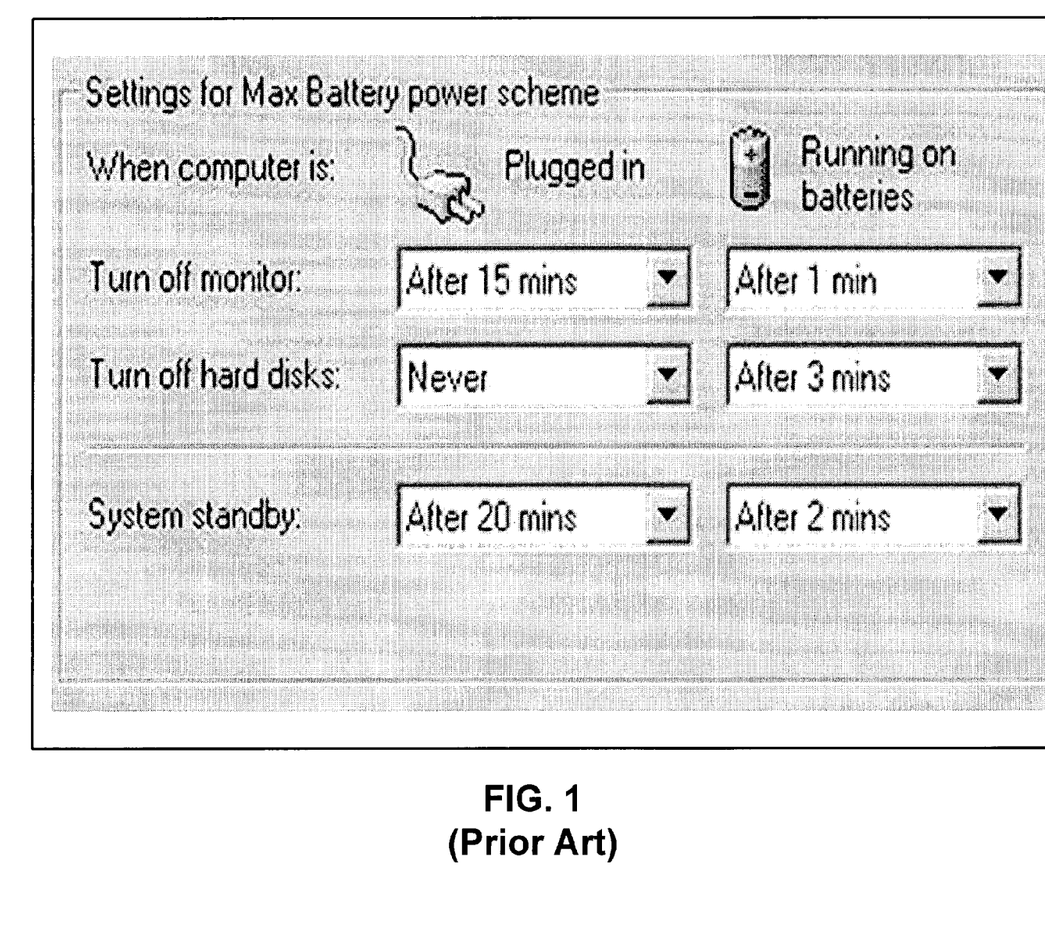
FIG. 1 illustrates a prior art example of a pop-up window used to specify power management preferences.

One approach to power management is by setting user's preference using the operating system and BIOS (basic input/output system). The BIOS registers setting controls a length of time the system must be active after user inactivity. For example, power to the display can be managed by setting a power off option in a power management properties menu to a certain fixed expiration value. The expiration value may be set to any value provided in a pop-up window ranging from 1 minute to "never". The expiration value is static and remains the same until another value is selected. FIG. 1 illustrates a prior art example of a pop-up window used to specify power management preferences. As illustrated in FIG. 1, power can be managed by setting user's preference to turn off monitor, hard disks and to put the system in standby mode.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

For one embodiment, a computer system is coupled to an image-capturing device. An image of a user in front of the computer system is analyzed to determine user attention. When the user is not paying attention, power consumption of one or more components of the computer system is reduced.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

One disadvantage of the techniques illustrated in FIG. 1 is that there is no reduction in power consumption during the idle time when the computer system is not in use. The idle time of a computer system may be extensive. For example, the idle time may range between approximately 50% and 80% of the total time that a user is supposedly using the computer system. For example, the user may be thinking, reading something on the side, talking to someone on the phone or someone nearby, etc. instead of continuously typing on the keyboard or controlling the movement of the mouse. Thus, it would be advantageous to further reduce the power consumption of the computer system during the idle times.

Computer System

Figure 2A:
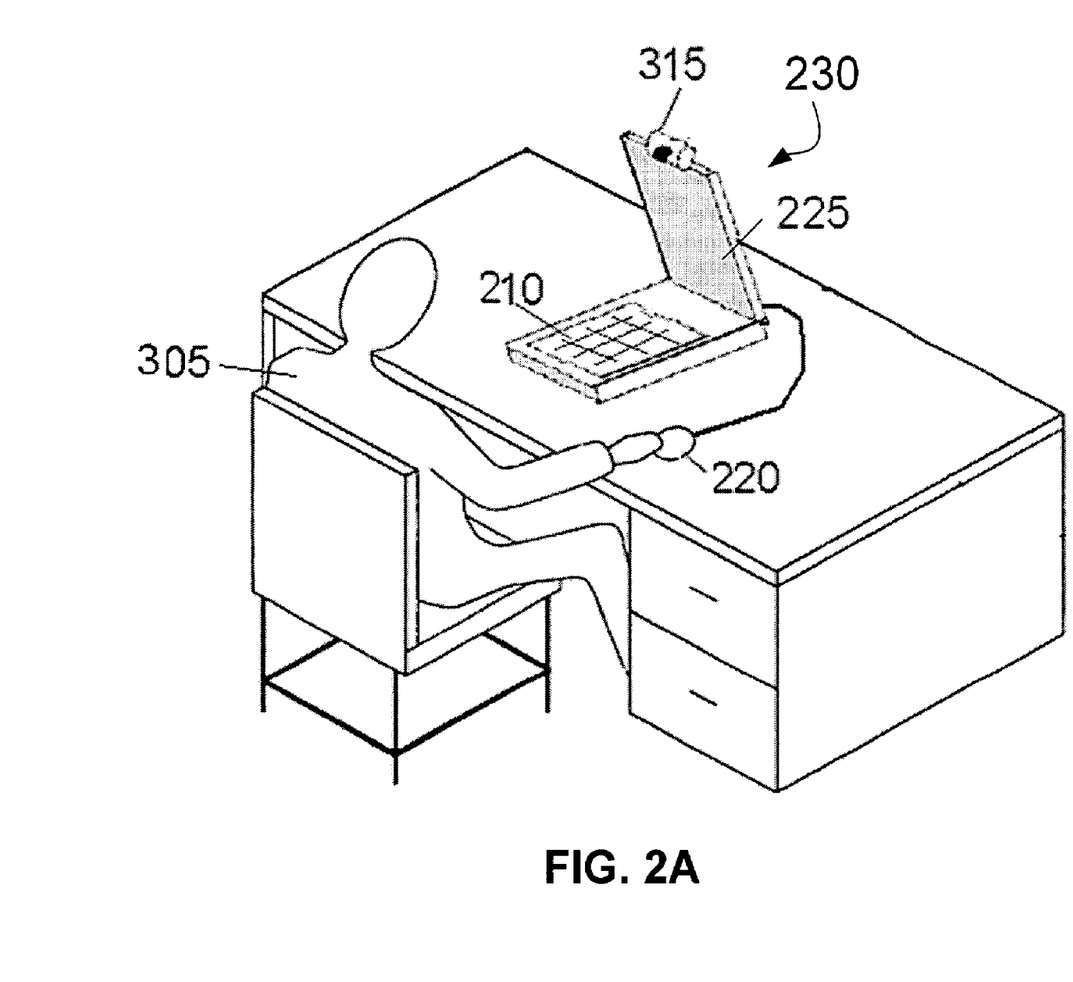
FIG. 2A is a diagram illustrating an example of a computer system according to one embodiment.

FIG. 2A is a diagram illustrating an example of a computer system according to one embodiment. In this example, computer system 230 is illustrated as a portable computer system, although it may also be a non-portable computer system (e.g., a desktop system, a server, etc.). The computer system 230 may draw power from either an alternating current (AC) power source or from a direct current (DC) power source such as, for example, a battery. The computer system 230 may include a keyboard 210, a cursor-control device 220, and a display 225. Although not shown, the computer system 230 may also include other components such as, for example, a processor, a hard drive, etc.

For one embodiment, the computer system 230 may also include a visual monitoring device or image-capturing device 315 such as, for example, a digital video camera, a video recording camera, etc. The image-capturing device 315 may be coupled to the computer system 230 using a coupling device (not shown). Alternatively, the image-capturing device 315 may be integrated in the computer system 230 via the display 225. Other methods for coupling the image-capturing device 315 with the computer system 230 may also be used. For one embodiment, the image-capturing device 315 may be positioned to capture an image of an area in front of the computer system 230. Typically, a user 305 is positioned near or in front of the computer system 230 to use the computer system 230. Depending on the operating platform of the computer system 230 (e.g., Windows, etc), a device driver (not shown) may be used to enable the image-capturing device 315 to interact with the computer system 230.

Figure 2B:
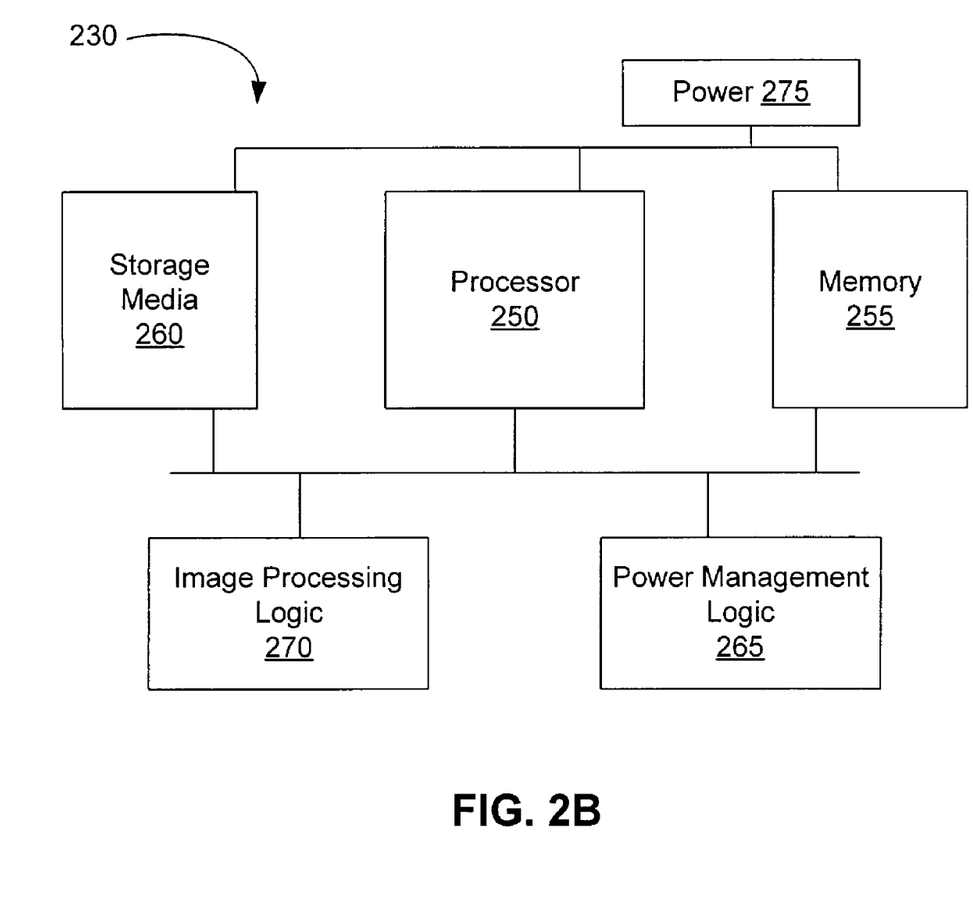
FIG. 2B is a diagram illustrating an example of components in a computer system according to one embodiment.

FIG. 2B is a diagram illustrating an example of components in a computer system according to one embodiment. The computer system 230 may include a central processing unit (CPU) or processor 250, and a memory 255 which may be, for example, random access memory (RAM), read-only memory (ROM), etc. The computer system 230 may also include a storage media 260 which may be, for example, a disk drive, etc. A power source 275 such as, for example, a battery, may be used to provide power to the components of the computer system 230.

For one embodiment, the computer system 230 may include power management logic 265. The power management logic 265 may control power consumption of various components in the computer system 230. For example, the power management logic 265 may control power consumption of the display 225, the processor 250, the storage media 260, etc. The power management logic 265 may control power consumption of the various components using known techniques. For example, the power management logic 265 may control power consumption of the processor 250 using different processor power consumption states (e.g., C0, C1, C2, and C3) as sets forth in the Advanced Configuration and Power Interface (ACPI) Specification (Rev. 2.0a, Mar. 31, 2002). The power management logic 265 may be implemented in software, hardware, or a combination of both software and hardware.

Image Processing

For one embodiment, the computer system 230 may include image-processing logic 270. The image-processing logic 270 may be used to process an image captured by the image-capturing device 315. The image-processing logic 270 may support different image formats so that it can process images captured by different types of image-capturing devices. When the image-processing logic 270 receives the image, it may perform various operations to analyze the image. For example, the various operations may include operations to detect whether the user is positioned in front of the computer system 230. The image-processing logic 270 may be implemented in software, hardware, or a combination of both hardware and software.

For one embodiment, a sampling rate may be used to control the operations of the image-capturing device 315. For example, the sampling rate may enable the image-capturing device 315 to capture an image of the area in front of the computer system 230 based on a selected frequency (e.g., every two seconds). The captured image may or may not include the user 305 depending on whether the user is positioned in front of the computer system 230 when the image is captured.

Figure 3:
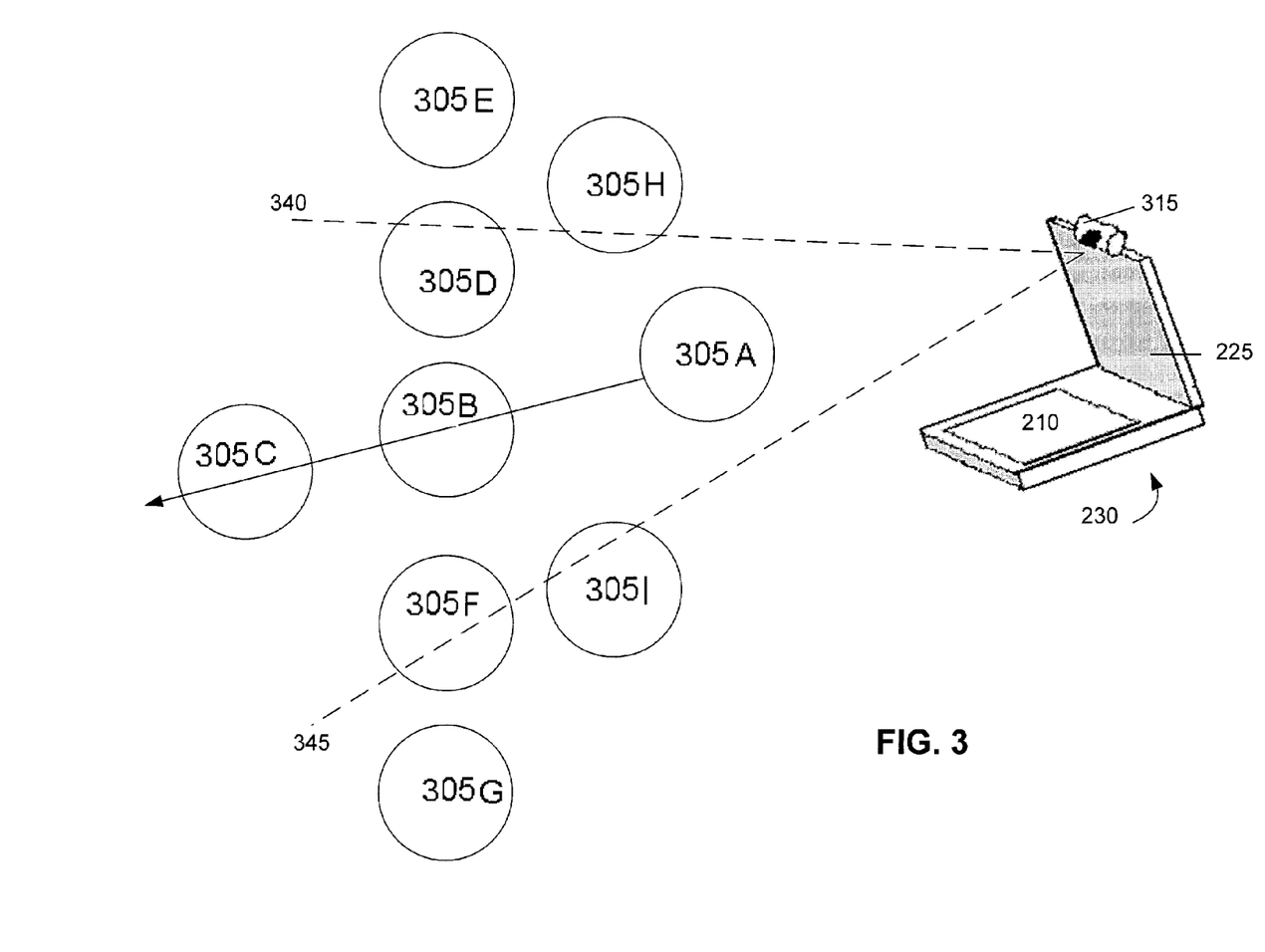
FIG. 3 is a diagram illustrating examples of positions of a user in front of the computer system according to one embodiment.

FIG. 3 is a diagram illustrating examples of positions of a user in front of the computer system. For one embodiment, the user 305 may be detected by the image-processing logic 270 in a captured image when the user 305 stays within a certain zone in front of the computer system 230. For example, the zone may include an area viewable from a viewfinder (not shown) of the image-capturing device 315. The zone is illustrated in FIG. 3 as the area between the dotted lines 340 and 345. For example, the image-processing logic 270 may be able to detect the user 305 in a captured image when the user 305 is at position 305A, 305B, or 305C.

For one embodiment, the image-processing logic 270 may also be able to detect the user 305 when the user 305 is positioned partially out of the zone, as illustrated in position 305D or 305F. A detection threshold may be used to determine when the user 305 is detected. For example, the detection threshold may be set at ninety (90) percent such that when 90 percent or more of the facial contour is captured in the image, it may be concluded that the user 305 is detected. Thus, the user 305 may not be detected when the user 305 is only partially in the zone, as illustrated in position 305H or 305I.

For one embodiment, the user's eyes may be used to determine whether the user is paying attention. It may be noted that paying attention may include, for example, the user facing the display 225. Paying attention may also include the user's eyes focusing on the display 225 even though the user's face may be partially out of the zone. Paying attention may also include looking at or facing any device such as, for example, the image-capturing device 315 that is capable of communicating with the computer system 230. The device may allow the computer system 230 to perform appropriate operations such as, for example, power management operations, when applicable. Of course, when the user 305 is completely out of the zone (as illustrated in positions 305E and 305G) the user 305 is not detected, and thus can be determined as not paying attention.

Although the example in FIG. 3 illustrates a zone as the area between the dotted lines 340 and 345, it may be noted that the zone may vary depending on the type of image-capturing device 315 used and/or how the image-processing device 315 is positioned. For example, the image-capturing device may include multiple viewfinders, and as such the zone may cover a much wider area.

Face Tracking

For one embodiment, the user's biometric characteristics may be used to determine user's movement. The biometric characteristics may include, for example, a facial contour. The image-processing logic 270 may include logic to recognize a user's facial contour and logic to track where the user is looking. For example, the image-processing logic 270 may track the user in six degrees of freedom (6DOF) and determine the user's movement in three-dimensional space. Methods of finding a face (or facial contour) and tracking the 6DOF structure of a face are well known to one skilled in the art. For example, one method of finding a face is described in "*Rapid Object Detection using a Boosted Cascade of Simple Features*" by Paul Viola. For another example, one method of tracking the 6DOF structured is described in "*Learning A Face Model For Tracking And Recognition*" by Zakaria Ajmal, et al.

Figure 4A:
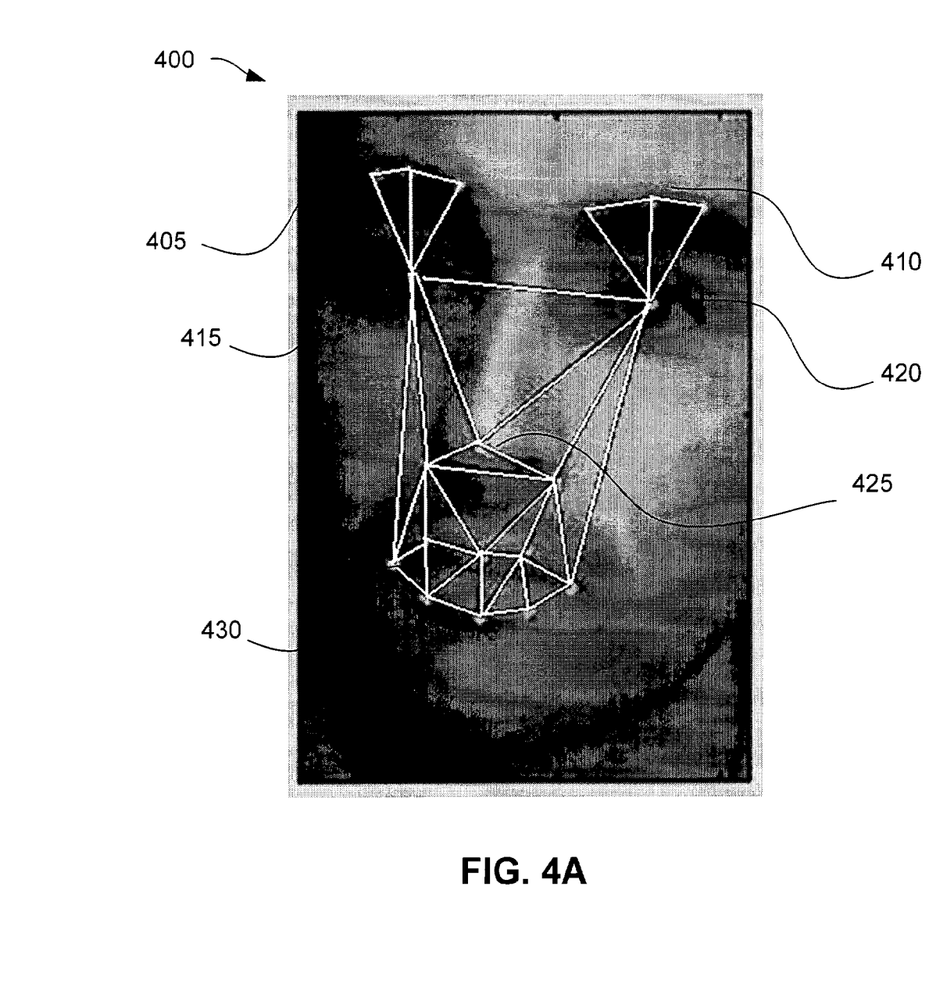
FIG. 4A illustrates an example of a face tracking technique that may be used to determine user attention.

FIG. 4A illustrates an example of a face tracking technique that may be used to determine user attention. In this example, the technique is a shape model constrained optical flow face-tracking technique. A mesh of facial interest points with multiple intersecting lines is formed to identify different facial points on face 400 of the user 305. This may include, for example, left eye brown 405, right eye brown 410, left eye 415, right eye 420, nose point 425, and lips 430. For example, when the mesh associated with the face 400 is determined to be symmetrical, the user 305 may be determined as paying attention. The symmetry may be determined using a certain symmetry threshold.

Figure 4B:
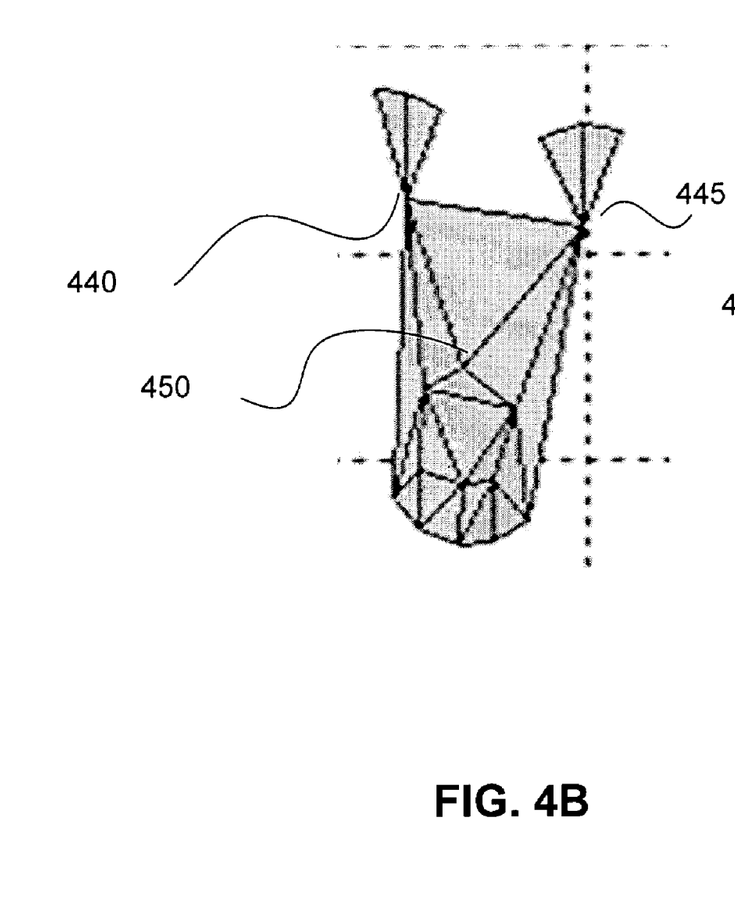
FIGS. 4B and 4C illustrate examples of a face at different positions.
Figure 4C:
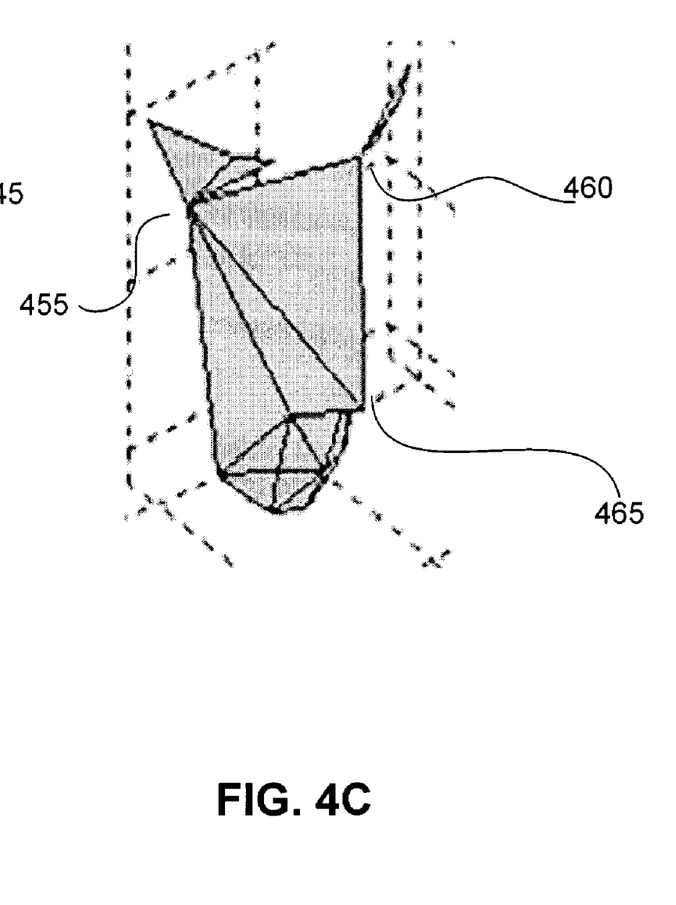

For one embodiment, the nose point 425 on the mesh illustrated in FIG. 4A may be used as an approximation of where the face 400 is directing or looking at. When the user 305 turns sideway from a position illustrated in FIG. 4B to a position illustrated in FIG. 4C, the mesh tracks the movement of the face 400. For example, the mesh illustrated in FIG. 4C is not as symmetrical as the mesh illustrated in FIG. 4B. In this example, the nose point 450 in FIG. 4B is more in between the left eye 440 and the right eye 445 (in FIG. 4B) than the nose point 465 in FIG. 4C relative to the left eye 455 and the right eye 460 (in FIG. 4C).

For one embodiment, the face-tracking technique may periodically track where the face 400 is looking. For example, when the mesh is approximately symmetrical, the user 305 may be facing (or paying attention to) the display 225. When the mesh is not symmetrical, the user 305 may be facing away from the display 225. For one embodiment, when it is determined that the user 305 is present but temporarily not paying attention, the power management logic 265 may perform some power conserving operations. For example, when the user 305 faces away temporarily, the display 225 may be dimmed. For another embodiment, when it is determined that the user 305 is not paying attention for a long period (e.g., based on periodic tracking), the power management logic 265 may perform further power conserving operations. For example, when the user 305 is present but is reading a book, the display 225 may be powered off.

Figure 4D:
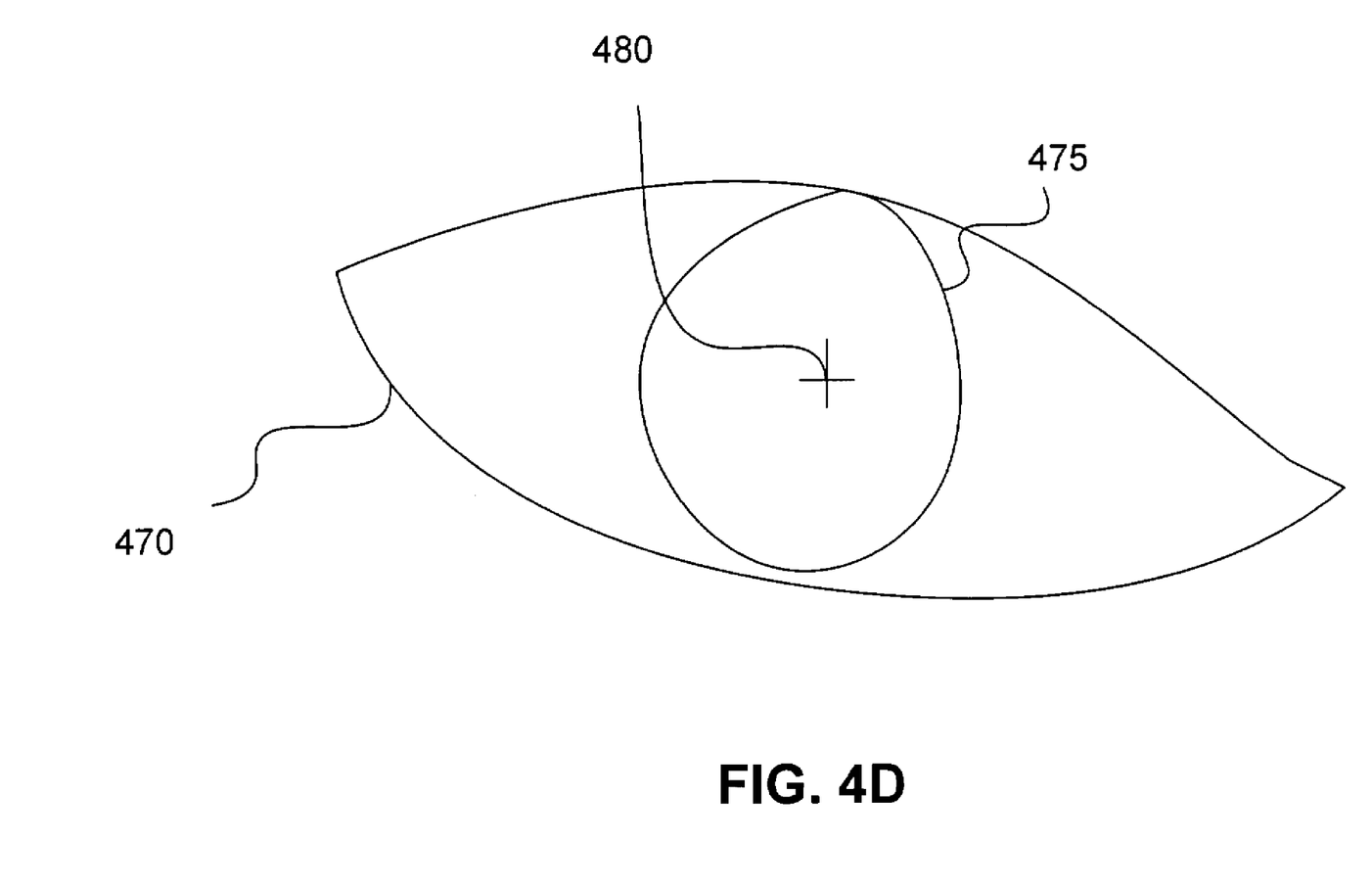
FIG. 4D illustrates an example of using the gaze to determine user attention.

FIG. 4D illustrates an example of using the gaze to determine user attention. For one embodiment, an eye region may be used to track the user's gaze. The eye region may be located by identifying an eye point on a mesh as illustrated in FIG. 4A. An eyes tracking technique may be used to track the user's gaze. For example, when the gaze is directed at the display 225, the user 305 may be determined as paying attention. When the gaze is not directed at the display 225, the user 305 may be determined as not paying attention. Referring to FIG. 4D, eye region 480 of pupil 475 may be located. The pupil 475 may then be fit with a circle, and a "white-black-white" calculation across the eye 470 may be used to find the direction of gaze. Techniques for determining eye gaze are known to those skilled in the art. For example, one method of determining eye gaze is described in "*Vision-Based Eye-Gaze Tracking for Human Computer Interface*", by Kyung-Nam Kim, and R. S. Ramakrishna. Other techniques may also be used to determine the user attention.

Behavior

For one embodiment, the face tracking technique may be used to learn the user's behavior. For example, with the display 225 as a reference, when the user 305 faces away from and toward the right of the display 225, the user 305 tends to remain facing in that direction for a long period of time. As such, the power management logic 265 may take the more drastic power management operations sooner. When the user 305 faces to the left of the display 225, it is usually for a very short time, and as such, less drastic power management operations may be taken.

Power Management Process

Figure 5:
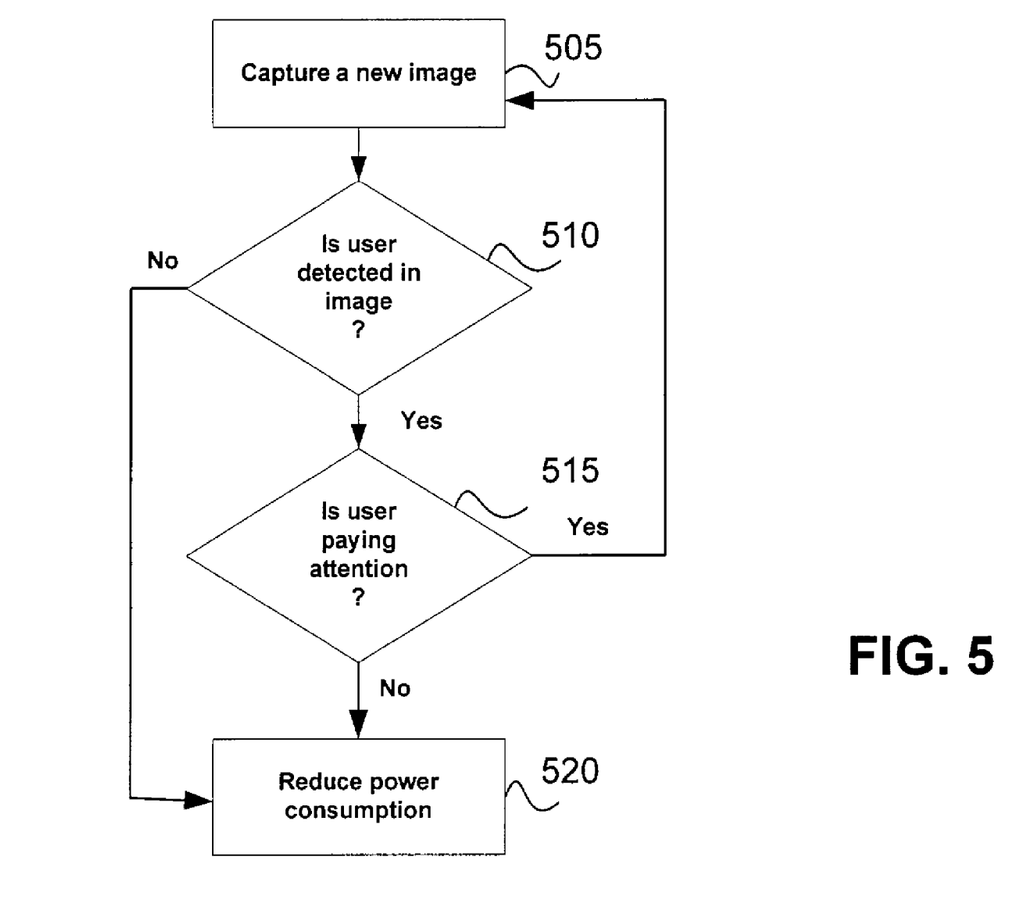
FIG. 5 is a flow diagram illustrating an example of a power management process based on user attention, according to one embodiment.

FIG. 5 is a flow diagram illustrating an example of a power management process based on user attention, according to one embodiment. In this example, the user 305 may be using the computer system 230, and the process may be used to detect whether the user 305 is present in front of the computer system 230, and if so determination may be made whether the user 305 is paying attention.

At block 505, an image is captured by the image-capturing device 315. A sampling rate may be set such that the image is taken periodically. When the image is captured, it may be analyzed to detect whether the user 305 is present, as illustrated in block 510. It may be noted that the user 305 may be at a different position each time an image is captured, as illustrated in FIG. 3. As described above, the user 305 may be detected in the image, for example, by detecting facial contour. When the user 305 is not detected in the image, the process flows to block 520. At block 520, appropriate actions may be taken to reduce the power consumption of one or more components in the computer system 230.

From block 510, when the user 305 is detected in the image, the process flows to block 515 where a test is made to determine if the user is paying attention. When the user 305 is determined to be paying attention, the process flows from block 515 to block 505.

From block 515, when the user is determined to not be paying attention, the process flows to block 520. At block 520, appropriate actions may be taken to reduce the power consumption of one or more components in the computer system 230.

Figure 6:
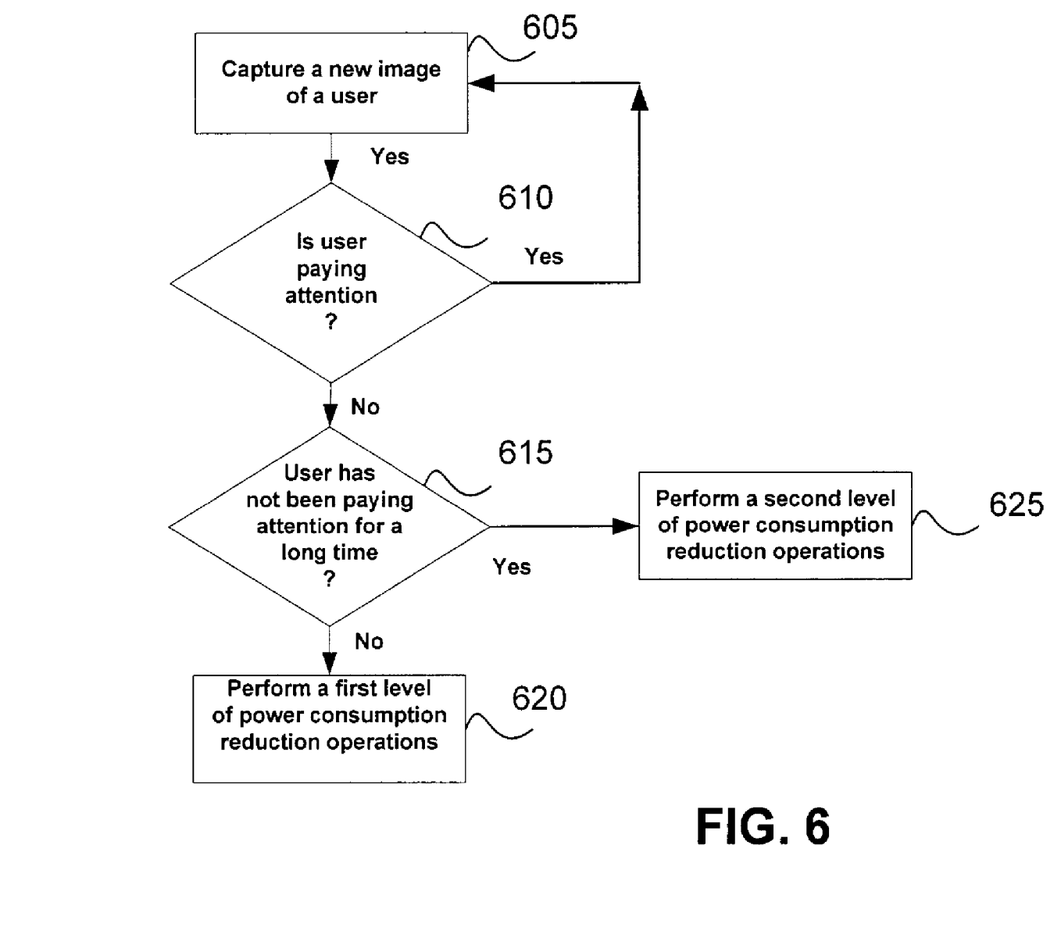
FIG. 6 is a flow diagram illustrating an example of a process used to reduce power consumption based on a period of time when the user does not pay attention, according to one embodiment.

FIG. 6 is a flow diagram illustrating an example of a process used to reduce power consumption based on a period of time when the user does not pay attention, according to one embodiment. At block 605, an image is captured by the image-capturing device 315. At block 610, a test is made to determine if the user is paying attention. When the user is determined to be paying attention, the process flows from block 610 to block 605 to capture another image. As described above, the new image may be captured periodically. From block 610, when the user is determined to not be paying attention, the process flows to block 615 where a test is made to determine if the user has not been paying attention for a while. For example, the user may be determined to not pay attention only for a short period, some (or a first level) power management operations may be performed, as shown in block 620. However, when it is determined that the user has not been paying attention for a long period of time (e.g., based on the tracking period), more drastic power management operations (e.g., a second level) may be performed, as shown in block 625.

Figure 7:
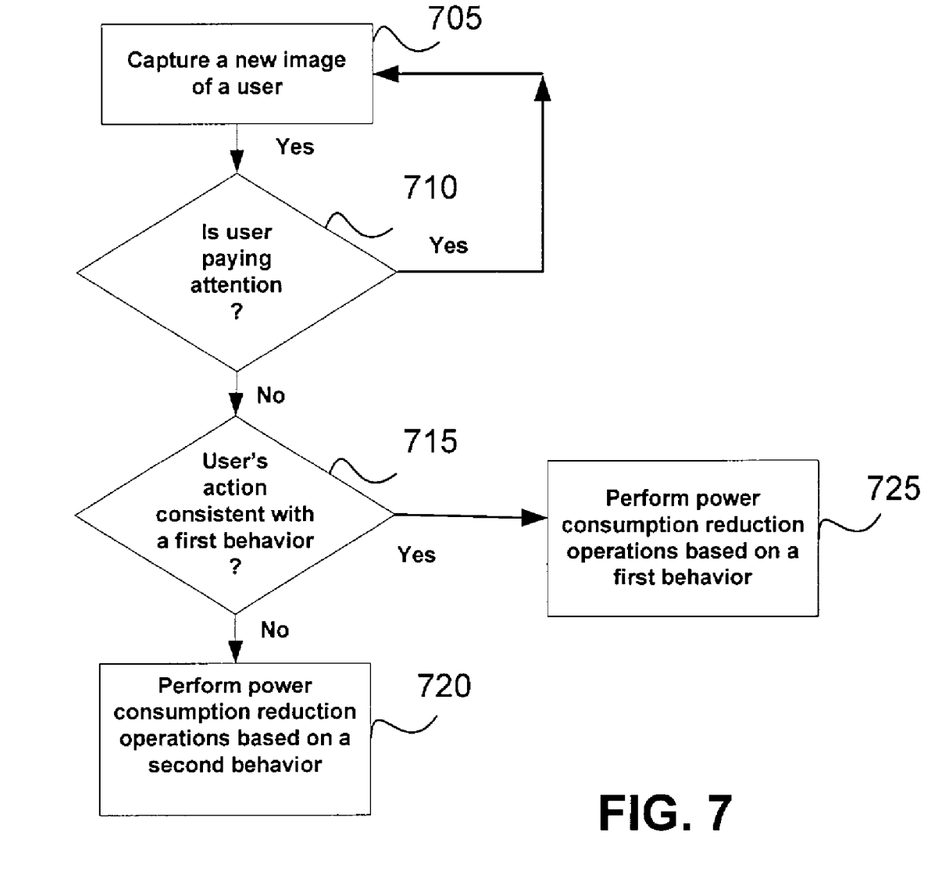
FIG. 7 is a flow diagram illustrating an example of a process used to perform power management operations based on user behavior, according to one embodiment.

FIG. 7 is a flow diagram illustrating an example of a process used to perform power management operations based on user behavior, according to one embodiment. At block 705, an image is captured by the image-capturing device 315. At block 710, a test is made to determine if the user is paying attention. When the user is determined to be paying attention, the process flows from block 710 to block 705 to capture another image. From block 710, when the user 305 is determined to not be paying attention, the process flows to block 715 where a test is made to determine the user's behavior. The user's behavior may be learned over a period of time, and the knowledge is stored in the computer system 230. For example, over a period of time, it may be learned that whenever the user 305 faces toward the right side (e.g., first behavior) of the computer system 230, the user 305 may face in that direction for at least five minutes. As another example, whenever the user 305 faces toward the left side (e.g., second behavior) of the computer system 230, the user 305 may face in that direction for an average of one minute. In this example, different power management operations may be performed depending on whether it's the first behavior (as shown in block 725) or the second behavior (as shown in block 720). It may be noted that multiple behaviors may be learned, and the power management logic 265 may perform the appropriate power management operations according to the recognized behavior.

For one embodiment, the power management operations may be accomplished by decreasing the power used by one or more components in the computer system 230, whenever applicable. For example, the power consumption of the display 225 may be reduced by dimming its brightness level. For another embodiment, the power management operations may be accomplished by reducing power consumption to zero, thereby essentially powering off the component.

Figure 8:
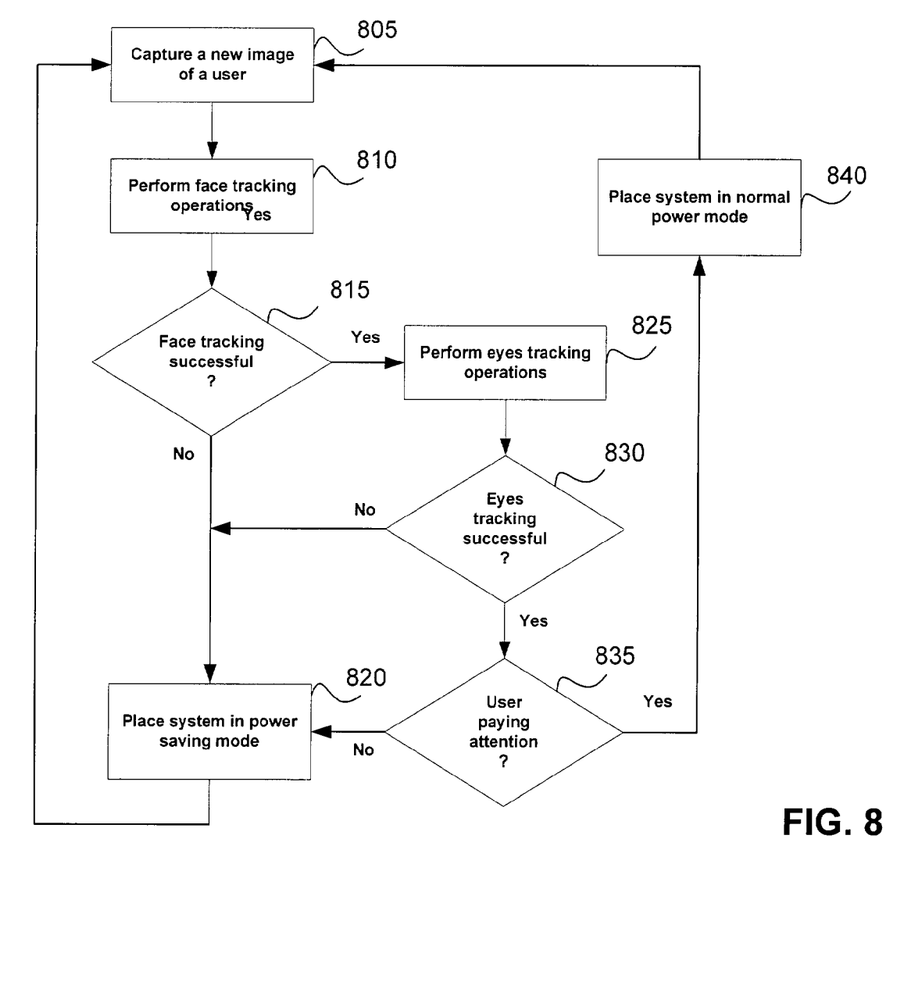
FIG. 8 is a flow diagram illustrating an example of a process used to perform power management operations based on a face tracking technique and an eyes tracking technique, according to one embodiment.

FIG. 8 is a flow diagram illustrating an example of a process used to perform power management operations based on a face tracking technique and an eyes tracking technique, according to one embodiment. At block 805, an image is captured by the image-capturing device 315. At block 810, the face tracking technique is performed to detect the face 400. At block 815, a test is made to determine if the face 400 is successfully tracked. As described above, a threshold may be used to determine if the face 400 is tracked. When the face 400 cannot be tracked, the process flows to block 820 where power management operations are performed to place the computer system 230 in a power saving mode. It may be noted that the computer system 230 may already be in the power saving mode. For example, the user 305 may be taking a break in a different area away from the computer system 230.

When the face 400 is tracked, the process flows from block 815 to block 825 where the eyes tracking technique is performed to determine the eyes. At block 830, a test is made to determine if the eyes are successfully tracked. When the eyes cannot be tracked, the process flows from block 830 to block 820 where power management operations are performed to place the computer system 230 in the power saving mode.

From block 830, when the eyes are tracked, the process flows to block 835 where a test is made to determine if the user is paying attention. When it is determined that the user 305 is not paying attention, the process flows to block 820. When it is determined that the user 305 is paying attention, the process flows from block 835 to block 840 where the computer system 230 is placed in a normal power mode. It may be noted that the computer system 230 may already be in the normal power mode. It may also be noted that, as described above, the user's gaze may be used to help determine the user attention.

Computer Readable Media

The operations of these various methods may be implemented by a processor in a computer system, which executes sequences of computer program instructions which are stored in a memory which may be considered to be a machine-readable storage media. For example, the computer system may be the computer system 230, and the machine-readable storage media may be the storage media 260 illustrated in FIG. 2B. The memory may be random access memory (RAM), read only memory (ROM), a persistent storage memory, such as mass storage device or any combination of these devices. Execution of the sequences of instruction may cause the processor to perform operations according to one embodiment the present invention such as, for example, the operations described in FIGS. 5-8.

Techniques for power management operations in computer systems using an image-capturing device have been disclosed. The techniques may operate in real time allowing power consumption to be reduced shortly after the user attention is lacking. The techniques may reduce wasted power during the idle times resulting in additional power saving. The techniques may also prevent annoying situations experienced with prior art techniques when the displayed is powered off while the user is viewing information on the display.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A system, comprising:
   an image-capturing device;
   an image-processing logic coupled to the image-capturing device, the image-processing logic is to determine a direction of a user's gaze captured by the image-capturing device to determine whether the user is paying attention to a display coupled to the image-capturing device; and
   a power management logic coupled to the image-processing logic, wherein the power management logic is to perform one or more power management operations related to the display based on whether the user is paying attention to the display, the one or more power management operations includes operations to reduce power consumption of the display when the user is not paying attention to the display, wherein the operations to reduce the power consumption of the display include operations to dim the display if the user has not been paying attention for a short period of time and operations to power off the display if the user has not been paying attention for a long period of time.

2. The system of claim 1, wherein the power management logic is to further perform one or more power management operations related to other components in the system.

3. A machine-implemented method, comprising:
   tracking the direction of a user's gaze by analyzing data about the face of the user as captured by an image-capturing device; and
   reducing power consumption of one or more components in a computer system when the user is not paying attention to a display associated with the computer system, by dimming the display if the user has not been paying attention for a short period of time, and by powering off the display if the user has not been paying attention for a long period of time wherein user attention is determined by said tracking.

4. The method of claim 3, wherein reducing the power consumption of the one or more components in the computer system when the user is not paying attention comprises reducing the power consumption based on the period that the user has not been paying attention.

5. The method of claim 3, wherein the image-capturing device is a video recording camera or a digital camera.

6. A machine-implemented method, comprising:
performing one or more face tracking operations to detect a use's face in an image captured by an image-capturing device coupled to a computer system, including recognizing the user's facial contour;
when the user's face is detected, tracking the direction of the user's gaze using data about the user's face to determine if the user is paying attention to a display, by tracking six degrees of freedom, 6DOF, and determining the user's movement in three-dimensional, 3D, space, wherein the tracking by 6DOF and determining the user's movement in 3D space comprises forming a mesh of facial interest points with multiple intersecting lines, the user is determined to be paying attention to the display when the mesh is symmetrical, and the user is determined to not be paying attention to the display when the mesh is asymmetrical; and
performing one or more power management operations to control power consumption of one or more components of the computer system depending on the user paying attention to the display.

7. The method of claim 6, wherein the image-capturing device captures an image periodically.

8. The method of claim 7, wherein performing one or more power management operations to control power consumption includes reducing power consumption of the display when the user is not paying attention.

9. The method of claim 8, wherein reducing the power consumption of the display includes dimming the display or powering off the display.

10. A computer readable medium containing executable instructions which, when executed in a processing system having a display, causes the processing system to:
track direction of a user's gaze by analyzing data about the face of the user as captured by an image-capturing device, and learn the user's behavior namely (1) when the user faces away from and toward one side of the display, he tends to remain facing in that direction for a long period of time, and (2) when the user faces away from and toward another side of the display, it is for a short period of time; and
reduce power consumption of one or more components in a computer system when the user is not paying attention to a display coupled to the computer system as determined by the learning.

* * * * *